(12) United States Patent
Chauhan et al.

(10) Patent No.: US 8,594,611 B2
(45) Date of Patent: Nov. 26, 2013

(54) INTRINSICALLY SAFE PORTABLE RADIO ARCHITECTURE

(75) Inventors: Paresh Chauhan, Lynchburg, VA (US);
Jonathan Black, Lynchburg, VA (US);
David Hinterberger, Fairport, NY (US);
Brian Martens, Spencerport, NY (US);
David Grunert, Coleman Falls, VA (US)

(73) Assignee: Harris Corporation, Melbourne, FL (US)

( * ) Notice: Subject to any disclaimer, the term of this patent is extended or adjusted under 35 U.S.C. 154(b) by 274 days.

(21) Appl. No.: 13/166,038

(22) Filed: Jun. 22, 2011

(65) Prior Publication Data

US 2012/0329409 A1 Dec. 27, 2012

(51) Int. Cl.
*H04B 1/16* (2006.01)
*H04B 1/04* (2006.01)

(52) U.S. Cl.
USPC ............ 455/343.1; 455/127.1; 455/572

(58) Field of Classification Search
USPC .......... 455/127.1, 351, 128, 572, 556.1, 90.3, 455/571, 575.1, 343.1, 343.2, 127.5, 550.1; 381/315, 334
See application file for complete search history.

(56) References Cited

U.S. PATENT DOCUMENTS

| | | | | |
|---|---|---|---|---|
| 5,991,420 A * | 11/1999 | Stern | ............................ | 381/315 |
| 7,945,295 B2 * | 5/2011 | Oglesbee et al. | ............. | 455/572 |
| 8,442,596 B2 * | 5/2013 | Frerking et al. | ........... | 455/568.1 |
| 2005/0079820 A1 * | 4/2005 | Yamashita | ................... | 455/41.2 |
| 2005/0143124 A1 | 6/2005 | Kennedy et al. | | |
| 2007/0121981 A1 * | 5/2007 | Koh et al. | ...................... | 381/334 |
| 2008/0303681 A1 | 12/2008 | Herz et al. | | |
| 2009/0143111 A1 | 6/2009 | Oglesbee et al. | | |

FOREIGN PATENT DOCUMENTS

| | | |
|---|---|---|
| GB | 2326051 A | 12/1998 |
| WO | 2008033795 A1 | 3/2008 |

OTHER PUBLICATIONS

Approval Standard for Intrinsically Safe Apparatus and Associated Apparatus for Use in Class I, II and II, Division 1, Hazardous (Classified) Locations; FM Approvals LLC, Jan. 2010.
American National Standard, NSI/ISA-60079-11, 5th Edition, (Dec. 2, 2001)-2009, "Explosive Atmospheres—part 11: Equipment Protection by Intrinsic Safety "i"". Sep. 30, 2009.
International Search Report mailed Dec. 13, 2010, Application No. PCT/US2010/027491, in the name of Harris Corporation.
International Search Report mailed Sep. 19, 2012, Application Serial No. PCT/US2012/041793 in the name of Harris Corporation.

* cited by examiner

*Primary Examiner* — Pablo Tran
(74) *Attorney, Agent, or Firm* — Fox Rothschild, LLP; Robert J. Sacco

(57) ABSTRACT

An intrinsically safe portable radio device (100) having a portable radio device housing (120). A first radio section (201) is an intrinsically safe circuit is (ISC) disposed within the housing and arranged to perform at least one function to facilitate operation of the portable radio device. A second radio section (202) ISC is disposed within the housing and arranged to perform at least a second function to facilitate operation of the portable radio device. Each of the first and second ISCs independently satisfy a defined standard for intrinsically safe devices.

24 Claims, 2 Drawing Sheets

INTRINSICALLY SAFE PORTABLE RADIO ARCHITECTURE

BACKGROUND OF THE INVENTION

1. Statement of the Technical Field

The inventive arrangements relate to handheld portable radios, and more particularly handheld portable radios that are intrinsically safe.

2. Description of the Related Art

Intrinsic safety refers to a condition of safety in a hazardous environment, particularly a hazardous environment in which explosive or flammable gasses may be present. Generally, this means that the device will not produce any spark or thermal effects under normal or abnormal conditions that will ignite a specified gas mixture. In fact, an instrument which is intrinsically safe is designed so that it will not cause any type of ignition in any form under normal or abnormal operating conditions, including fault conditions. Standard setting bodies offer approvals and/or certification marks for equipment which can be shown to intrinsically safe in accordance with certain standards. One such approval standard that is well known is FM 3610 as promulgated by FM Approvals LLC. The FM 3610 standard was amended in January 2010.

Design of a handheld portable radio to achieve an intrinsically safe certification compliant with the FM 3610 standard can be a formidable task. The amended standard of Jan. 10, 2010 sets forth thermal requirements and spark ignition requirements which are more stringent than those in the past. Complying with these requirements in a relatively small form factor device is very challenging. In fact, it is generally accepted that the trade-offs required to achieve certification are likely to affect key radio performance parameters such as output power, battery life, and received audio power, to name a few.

Evidence of the degraded radio performance resulting from complying with intrinsically safe standards fact can be found in radios that meet the ATEX standard. The ATEX standard has been in place in the European Union since 2003 for protecting workers from potentially explosive atmospheres. Radios that meet the ATEX standard are typically lower output power and are not multi-mode. The new FM 3610 standard is not yet implemented in North America, and it remains unclear at this time whether manufacturers will be able to maintain existing levels of handheld radio performance without reducing transmitter output power.

SUMMARY OF THE INVENTION

Embodiments of the invention concern an intrinsically safe portable radio device having a portable radio device housing. A first intrinsically safe circuit (ISC) is disposed within the housing and arranged to perform at least one function to facilitate operation of the portable radio device. A second ISC is disposed within the housing and arranged to perform at least a second function to facilitate operation of the portable radio device. Each of the first and second ISCs independently satisfy a defined standard for intrinsically safe devices. The defined standard can be selected from among the group including but not limited to FM3610, IEC 60079-11 and ANSI/ISA 60079-11. A power distribution circuit is disposed within the housing and arranged to couple power from a power source to each of the first ISC and the second ISC. The first ISC includes a first power limiting circuitry interposed between the power distribution circuit and a first functional circuitry for performing the first functions. The second ISC similarly includes a second power limiting circuitry interposed between the power distribution circuit and second functional circuitry for performing the second function. The first and second power limiting circuitry are each arranged to limit a total power which can be communicated to the first and second functional circuitry, respectively. According to one aspect of the invention, the first and second power limiting circuitry are arranged to limit a first total power to the first functional circuitry which is different from a second total power to the second functional circuitry.

The first functional circuitry can advantageously include at least a microprocessor and a data storage device. The microprocessor and the data storage device can form a digital processing section of the portable radio device. The first functional circuitry can also include circuitry for performing other radio functions. For example, the first functional circuitry can include radio frequency (RF) receiver circuitry, RF transmitter circuitry, frequency synthesizer circuitry, and/or radio backlight circuitry. The second functional circuitry can be an audio section of a portable radio transceiver, which is designed to produce audio from received audio signals. Alternatively, the second functional circuitry can be an RF power amplifier section of the portable radio transceiver.

The first and second power limiting circuitry can be respectively include a first and second current limiting device. Each of the first and second current limiting devices respectively comprise an exclusive path through which electric power can be communicated to the first and second functional circuitry. In some embodiments the current limiting device can be a fusible link, current limiting resistors, or a semiconductor type current limiting device. The first power limiting circuitry is further configured to limit total continuous or instantaneous power which can be communicated to the first functional circuitry. According to one aspect of the invention, an instantaneous or continuous power which can be communicated to the first ISC is limited by a first current limiting device in series with the first fusible link. The first power limiting circuitry can also include a voltage limiting device for limiting a maximum voltage applied to the first functional circuitry. According to one aspect of the invention, the voltage limiting device can include a plurality of zener diodes.

At least a third ISC can also be provided. The third ISC can similarly include a third power limiting circuitry interposed between the power distribution circuit and second functional circuitry for performing a third function. According to one aspect of the invention, the first functional circuitry can include the digital processing section of the portable radio device, the second functional circuitry can include the audio section of the portable radio device, and the third functional circuitry can include the RF power amplifier section of the portable radio device.

Two or more signal lines can be provided for communicating information between the first ISC, the second ISC and the third ISC. A total power communicated from the second and third ISC to the first ISC is limited by a voltage limiting device, and a second current limiting device(s).

BRIEF DESCRIPTION OF THE DRAWINGS

Embodiments will be described with reference to the following drawing figures, in which like numerals represent like items throughout the figures, and in which.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Past attempts at satisfying intrinsically safe (IS) standards have generally focused on developing a portable radio which, when evaluated as a single integrated device, satisfies an applicable IS standard. However, this has resulted in substantial design compromises which dramatically increase the size of the portable radio, reduce performance, or both. The invention concerns a portable radio device in which two or more sections or portions comprising the device can independently satisfy an established standard for an intrinsically safe device. As such, each radio section can independently qualify as an intrinsically safe device or intrinsically safe circuit (ISC). Each radio section or ISC is disposed within a common housing of the portable radio device, with the result that the overall device also satisfies the standard for an intrinsically safe device. As used herein, an intrinsically safe device or ISC is one that has been designed so that it will not cause any type of ignition in any form under normal or abnormal operating conditions, including fault conditions. As such, an intrinsically safe device or ISC can satisfy an established standard for such devices, such as FM 3610 as promulgated by FM Approvals LLC, and amended in January 2010, or another such standard as may be known now or in the future. For example, such standards can also include IEC 60079-11 or ANSI/ISA 60079-11.

Figure 1:
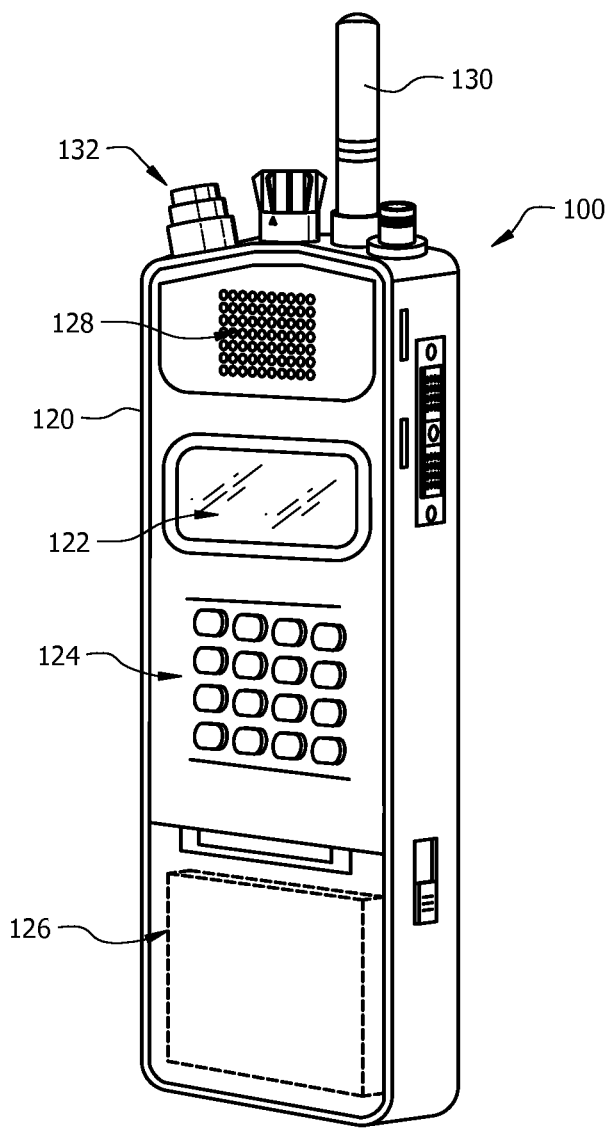
FIG. 1 a portable radio device which is useful for understanding the present invention.

Referring now to FIG. 1 there is shown a portable radio device 100. Portable radio device 100 can be any type of communication device having a receiver and/or transmitter, and data processing capability contained within a compact housing 120. As shown in FIG. 1, the portable radio device can have keyboard 124, and one or more control knobs 132 to facilitate user control and interaction with the device. A battery 126 provides power to the device through an interface (not shown). At least one antenna 130 facilitates reception and transmission of radio signals for operation of the receiver and/or transmitter. In some embodiments, the portable radio device will be capable of producing audible sounds for reproduction of speech, media and the like. In such embodiments, the portable radio device can also include an audio section capable of processing and amplifying audio signals. A speaker 128 can be provided for reproducing such audio signals for the benefit of a user.

Portable radio devices of the kind described with respect to FIG. 1, are used in a wide variety of applications. For some of those applications it is advantageous for the portable radio device 100 to satisfy certain standards which have been established for intrinsically safe (IS) devices such as FM 3610, IEC 60079-11 or ANSI/ISA 60079-11. Recent standards define certain minimum widths required for conductive traces used on circuit boards and on small electronic components. Modern portable radios with large amounts of memory and powerful processing capabilities demand the use of electronic components with closely spaced contact pins, especially if the compact size of the portable radio device is to be maintained. The spacing of the contact pins on the component is commonly referred to as the pin pitch or simply the pitch. A finely pitched component will have pins that are spaced relatively close as compared to less finely pitched components. Examples of finely pitched components, without limitation, include digital signal processing components such as microprocessors, and electronic memory devices. These finely pitched components, and the narrow width conductive traces of circuit boards which facilitate their use, often cannot satisfy IS standards when used in portable radio equipment. This problem arises in part because portable radio equipment typically includes one or more circuits that consume relatively large amounts of power. The combination of such high power consuming circuits with finely pitched components tends to result in violation of the standards for IS devices, such as FM 3610.

Figure 2:
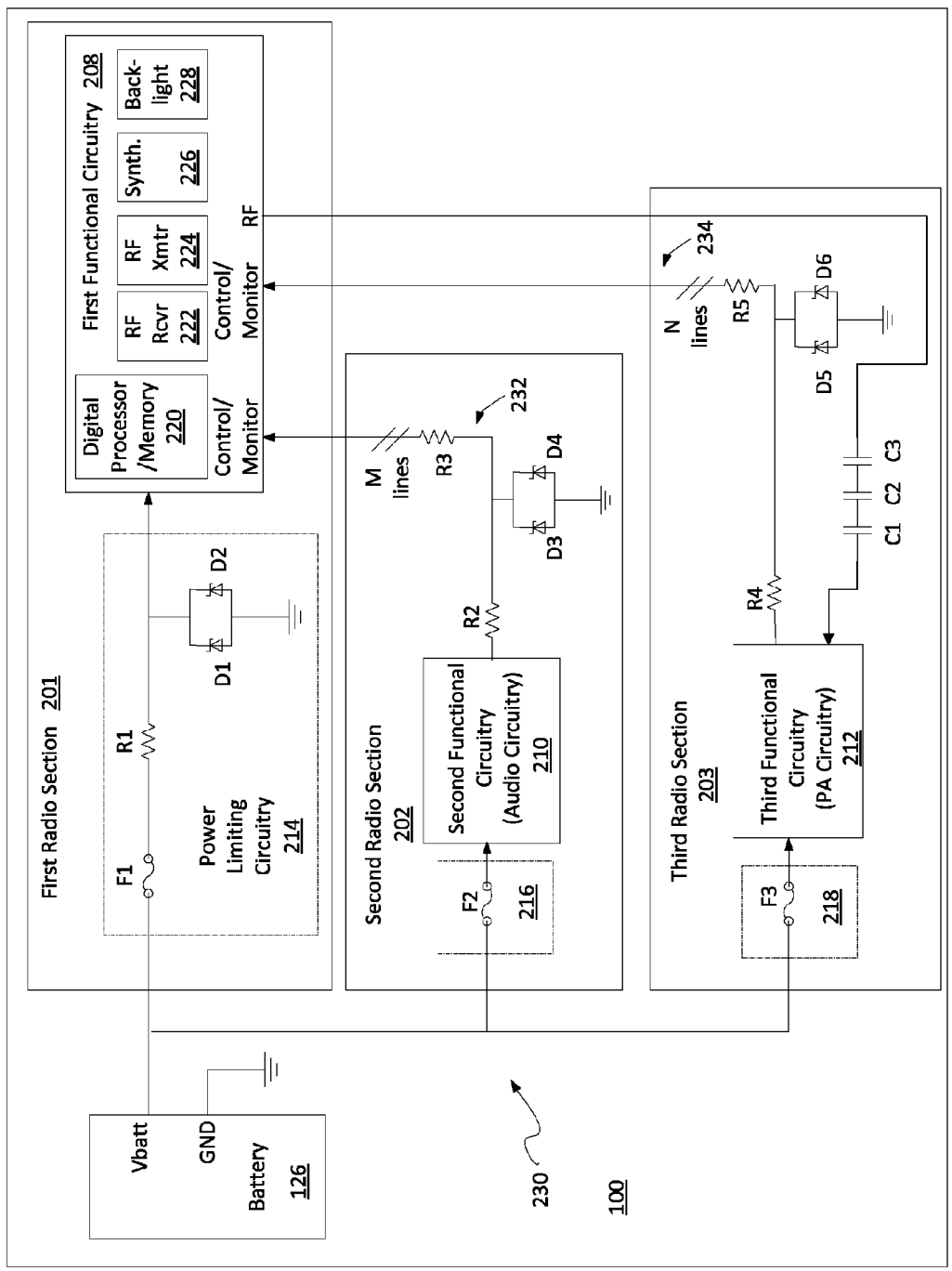
FIG. 2 is an architecture of the portable radio device in FIG. 1 that is useful for understanding the invention.

A system architecture for a portable radio device 100 capable of satisfying one or more IS standards such as FM 3610, IEC 60079-11 or ANSI/ISA 60079-11, without substantial reduction in performance or increase in size, is shown in FIG. 2. The portable radio device includes a plurality of radio sections. In the embodiment shown, these radio sections include a first radio section 201, a second section 202, and a third radio section 203. The system architecture preferably includes at least two such portable radio sections, but three or more radio sections can be provided within the scope of the present invention. Each of the first, second and third radio sections 201, 202, 203 is advantageously arranged to perform at least one function to facilitate operation of the portable radio device 100. To that end, the radio sections 201, 202, 203 respectively include first functional circuitry 208, second functional circuitry 210 and third functional circuitry 212. According to a preferred embodiment, each of the radio sections 201, 202, 203 can independently satisfy an established standard for an ISC. Each such ISC is disposed within a common housing of the portable radio device, such that the overall device also satisfies the standard for an intrinsically safe device.

Those skilled in the art will appreciate that one or more standards may exist for determining whether a device is intrinsically safe. Standards for IS devices can also change over time. Accordingly, the design of each radio section 201, 202, 203 can be chosen so as to satisfy any applicable IS standard. Moreover, there can be a wide variety of designs and trade-offs that can be considered when developing a radio section 201, 202, 203 which satisfies an IS standard. However, the invention is not limited to any particular design or technique or arrangement. The discussion which follows provides some specific examples for ensuring that a particular radio section 201, 202, 203 satisfies a particular standard for intrinsic safety. However, it should be understood that the invention is not limited in this regard, and other designs are also possible, provided that the resulting two or more radio sections satisfy an applicable IS standard.

According to one embodiment of the invention, an IS standard can be at least partially satisfied by providing power limiting circuitry, in the radio sections 201, 202, 203, to limit the amount of power that can be communicated to a particular radio section. A power distribution circuit 230 is disposed within the housing and arranged to couple power from a power source (e.g. battery 126) to each of the first, second and third radio sections. A first power limiting circuitry 214 is interposed between the power distribution circuit 230 and a first functional circuitry 208. A second and third power limiting circuitry 216, 218 are respectively interposed between the power distribution circuit 230 and second and third functional circuitry 210, 212. The first power limiting circuitry is arranged to limit first power communicated to the first functional circuitry so that it cannot exceed a first power level. The second power limiting circuitry is arranged to limit a second power communicated to the second functional circuitry so that it cannot exceed a second power level. The first power level can be different from the second power level. Similarly, the third power limiting circuitry can limit a third power communicated to the third functional circuitry 212 and such third power level can be is different as compared to the first and second power level. Still, the invention is not limited in this regard and in some cases, one or more of the power limiting circuitry can have the same power limiting characteristics.

Each of the first, second and third functional circuitry 208, 210, 212 can respectively perform any function or combination of functions which facilitate operation of a portable radio 100. However, it should be understood that certain advantages can be obtained based on the choice of which functions are combined. For example, finely pitched components can be particularly desirable or necessary for certain functional circuitry. Such finely pitched components may be permissible under certain IS standards only if a total power consumption of a device is limited below some threshold. Accordingly, in an embodiment of the invention, it can be advantageous to limit a maximum power communicated to a radio section including such finely pitched components so as not to exceed a particular power threshold established by an IS standard. Moreover, it can be advantageous to avoid combining functional circuits having such finely pitched components with other functional circuitry that is known to consume substantially more power.

In FIG. 2 there is illustrated one possible arrangement or distribution of functional circuits among a plurality of radio sections. The illustrated arrangement can work particularly well for purposes of permitting a portable radio device 100 to satisfy an IS standard. In the embodiment shown, the first functional circuitry 208 can include a digital processor/memory section 220 of a portable radio 100. The digital processor/memory section 220 can include a microprocessor and/or digital signal processor. The digital processor/memory section 220 can also include any necessary electronic memory or data storage devices suitable to facilitate operation of the digital processor. In one embodiment, the memory includes random access memory (RAM) and/or read only memory devices (ROM). Still, the invention is not limited in this regard and any other type of suitable memory device can be used. The digital processor/memory section can be configured to perform any digital processing task associated with operation of portable radio 100. Such functions can include, without limitation, signal processing, monitoring and controlling radio operations, monitoring of keyboard 124 and user inputs, management of the display 122, and/or encryption functions. Digital processors for performing these functions are well known in the art and therefore will not be described here in detail. However, it should be noted that such digital processor/memory circuitry can include many finely pitched components.

According to an embodiment of the invention, the first functional circuitry can also include one or more additional types of functional circuitry. For example, the first functional circuitry can include RF receiver circuitry 222, RF transmitter circuitry 224, frequency synthesizer circuitry 226 and backlight circuitry 228. The RF receiver circuitry can perform one or more functions to facilitate receiving RF signals. For example, such RF receiver circuitry can be arranged to provide functionality for detection, demodulation and filtering of RF signals received from an antenna. The functional circuitry can also include RF exciter or transmitter circuitry 224. The RF transmitter circuitry can be arranged to perform one or more function to facilitate generating RF signals for transmission. For example, such RF transmitter circuitry can be arranged to provide functionality to facilitate modulation, pre-amplification, and signal conditioning. The first functional circuitry can also include a frequency synthesizer 226. The frequency synthesizer can be configured to generate a local oscillator signal suitable to facilitate modulating and demodulating RF signals. The first functional circuitry can also include a backlight 228 for illuminating the display 122. Each of the foregoing types of circuits are well known in the art and therefore will not be described in detail. However, it should be understood that in some embodiments of the invention more or fewer types of circuitry can be included in the first functional circuitry within the scope of the present invention, and the listed elements are merely intended as one possible example.

The second functional circuitry 210 can be comprised of audio processing circuitry. Such audio processing circuitry can include one or more of signal processing, vocoder, audio amplifier and/or impedance matching circuits designed to reproduce audio signals and/or alert tones generated by the portable radio 100. The third functional circuitry can include RF power amplifier circuitry suitable for accepting a low level RF or digital input signal from exciter or transmitter circuitry, and generating a relatively higher power RF output signal. Those skilled in the art will appreciate that the audio circuitry 210 and RF power amplifier circuitry 212 can in many portable radio designs consume substantially more power as compared to the digital processor 220.

In the present invention, each radio section 201, 202, 203 is relatively independent of the others to the extent that it includes independent power limiting circuitry 214, 216, 218. Special precautions are also taken to ensure that electric power communicated to a particular radio section 201, 202, 203 from a different radio section cannot exceed predetermined levels established for that radio section. These special precautions are discussed in more detail below. However, the resulting arrangement is such that the various radio sections 201, 202, 203 are isolated or protected from each other in a way which ensures that an electrical fault in a first radio section will not result in excessive power being communicated to a second radio section. With the foregoing arrangement, each of the various radio sections 201, 202, 203 can effectively be classified as a separate device for purposes of IS evaluation under an applicable standard, such as FM 3610, provided that physical isolation requirements are also satisfied. Moreover, each radio section 201, 202, 203 can be independently qualified as an ISC. For example, the first radio section 201 can be a first ISC disposed within housing 120 of the portable radio 100. The second radio section 202 can be a second ISC disposed within the housing 120, and the third radio section 203 can be a third ISC disposed within the housing 120. Accordingly, two or more independent ISCs can be disposed within the common housing 120 in the embodiment shown.

As noted above, each of various radio sections 201, 202, 203 can effectively be classified as a separate device for purposes of IS evaluation under an applicable standard, such as FM 3610, provided that physical isolation requirements are also satisfied. For example, one or more IS standards can provide for physical spacing requirements between circuits in order for them to be considered separate devices. Placing circuits on separate printed wiring boards can be a method to meet such requirements. The present invention is primarily focused on addressing issues of electrical isolation, but those skilled in the art will appreciate that electrical and physical isolation must both be addressed in order to have separate IS devices, and such adequate physical isolation between circuits is presumed for purposes of this disclosure.

The design architecture for a portable radio 100 in FIG. 2 will now be described in further detail. Under some IS standards (e.g. FM 3610), the minimum line or track widths required for conductive traces used on circuit boards within a device under IS evaluation do not apply if a device or circuit satisfies certain requirements. For example, some IS standards will not apply if a circuit is designed so that it will not consume more than some minimal amount of power under either normal or fault conditions. This minimal amount of power shall be referred to herein as $P_m$. To take advantage of this relaxed requirement for satisfying an IS standard, those circuit sections which demand finely pitched components are advantageously arranged so that the amount of power communicated to such section is a value which cannot exceed the power level $P_m$. Power communicated to such radio sections can be guaranteed not to exceed such level by means of suitable power limiting circuitry specifically for that section.

In the architecture shown in FIG. 1, finely pitched components are included in at least the digital processor/memory 220. The digital processor/memory 220 is included within first radio section 201. Accordingly, power limiting circuitry 214 is advantageously arranged so that the power communicated to the first radio section 201 cannot exceed $P_m$. By limiting the consumption of power in the first radio section 201, and providing power limiting circuitry 214 to ensure that power levels in such section cannot exceed $P_m$ under either normal or fault conditions, the first radio section can satisfy an IS standard while still including finely pitched components.

Under some IS standards, the minimum line widths required for conductive traces used on circuit boards will be applicable where power consumption of a device under consideration exceeds the minimal amount $P_m$. Still, the minimum line width requirements under such standards can be relatively less stringent if a device under evaluation is protected against consuming more than some defined amount of power $P_L > P_m$. By separating the various radio sections which consume relatively larger amounts of power, it is possible to limit the total power consumed by each section. For example, an audio section and an RF power amplifier section can be separated so that the power consumed by each section is less than a single radio section including both types of circuitry. The separation of circuit sections that consume relatively large amounts of power can ensure that each section consumes a total power less than $P_L$. If each section can be guaranteed not to exceed the power $P_L$ (e.g. by using suitable power limiting circuitry) the less stringent line width requirements can apply to that circuit.

In the embodiment of the invention shown in FIG. 2, power limiting circuitry 216 can limit the maximum power consumption of second radio section 202 so that it does not exceed the power level $P_L$. Similarly, the power limiting circuitry 218 can limit maximum power consumption in the third radio section 203 so that it does not exceed $P_L$. Alternatively, power limiting circuitry 218 can limit maximum power consumption to some other power level established by an IS standard which similarly permits application of a less stringent standard.

The specific power limiting circuitry 214, 216, 218 used to limit power consumption of a radio section can depend on many factors. Accordingly, the specific power limiting circuitry described herein should not be interpreted as limiting the invention. Instead, any suitable power limiting circuitry can be used to ensure that a particular radio section 201, 202, 203 is protected from current, voltage or power levels that exceeds a specification necessary for the device to qualify as intrinsically safe. The power limiting circuitry can also include one or more components that protect against transient voltage or current levels that exceed design specifications applicable for a particular radio section to qualify as being intrinsically safe.

According to one embodiment of the present invention, the power limiting circuitry can be a current limiting device, such as a fusible link F1, F2, or F3. Each of the fusible links respectively comprise an exclusive path through which electric power can be communicated to the functional circuitry 208, 210, 212. Fusible links are well known in the art and will not be described here in detail. However, it should be understood that any type of fail safe current limiting device could be used for this purpose. Those skilled in the art will appreciate that a fusible link is essentially a current limiting device. However, for devices which utilize battery power, the maximum applied voltage is always known and a maximum current limit for a fusible link can easily be computed based on a maximum allowable power permitted for a particular device.

In an embodiment of the invention, a determination of a maximum power that can be communicated to or consumed in a particular radio circuit 201, 202, 203 can be determined in accordance techniques defined by a particular IS standard. For example, in some IS standards, a maximum power communicated to a device can be evaluated based on a calculated value of Measured Matched Power (MMP). Those skilled in the art will appreciate that MMP can be understood as the power delivered to a circuit from a power supply that is resistively limited. A formula for calculating MMP can be as follows: $MMP = V^2/4R$, where V is the battery voltage and R is a series resistance value for the power supply. Once the MMP value of a circuit has been defined, one or more current limiting devices can be selected to ensure that battery current communicated to a particular device (in this case a radio section 201, 202, 203) cannot exceed a predetermined value. By limiting the current in this way it is possible to ensure that the maximum permissible MMP value for that device is not exceeded.

In certain IS standards, the spacing requirements between conductive traces is further restricted in accordance with a maximum voltage applied to a device. These spacing requirements are generally concerned with spark suppression in such devices. Under such standards, a higher applied voltage can require a larger spacing between all conductors within the device. If closer spacing between conductors is desired, the voltage levels in the device must be limited or reduced. A device can also be required to have less than a maximum capacitance value in order to satisfy an IS standard. This capacitance value can decrease in some IS standards as voltage is increased. In order to permit a desired spacing between conductive traces, and allow for any needed capacitance, one or more of the power limiting circuitry 214, 216, 218 can also include voltage limiting devices. The voltage limiting devices ensure that the maximum voltage applied to the associated functional circuitry 208, 210, 212 cannot exceed some predetermined limit. In the embodiment shown in FIG. 2, such voltage limiting function is included in power limiting circuitry 214. The voltage limiting circuitry in the embodiment shown is comprised of zener diodes D1, D2. Note that two such diodes are provided for purposes of redundancy, but the invention is not limited in this regard. Also, it should be appreciated that various IS standards may permit alternative voltage limiting devices to be used for this purpose and all such device are intended to be within the scope of the present invention.

An IS standard can also include limitations for the maximum permissible inductance associated with an ISC. The maximum inductance value established by an IS standard can change depending on the maximum current that can be communicated to a device. One skilled in the art will appreciate that a fusible link F1 can only provide a relatively slow current protection. Accordingly, the maximum current in a transient state will be determined by a value of a current limiting resistor R1. In view of the foregoing, one or more of the power limiting circuitry 214, 216, 218 can also include components which are arranged to limit a total instantaneous current which can be communicated to the functional circuitry. For example, in the embodiment shown in FIG. 2, the power limiting circuitry 214 is provided with at least one resistor R1 which is provided in series with the fusible link F1. The resistor R1 ensures that the instantaneous current communicated to the first radio section 201 can never exceed a predetermined amount, which amount is determined by the value of the resistor and the battery voltage in accordance with Ohm's law. Consequently, a maximum permissible inductance under an IS standard can be adjusted by careful choice of a current limiting resistor R1.

In a portable radio device, some communication of signals between various radio sections 201, 202, 203 is generally necessary. Accordingly, one or more conductors or signal lines 232, 234 can extend between the first, second and third radio sections as shown for facilitating such communication. For example signal lines 232 can include M lines and signal lines 234 can include N lines. Still, if each radio section 201, 202, 203 is to independently satisfy an IS standard, care must be taken to ensure that power communicated or transferred from one radio section to another does not exceed predetermined limits. The actual limits applicable to each radio section will depend on the design goals defined for such radio section for purposes of complying with a particular part of an IS standard.

According to one embodiment of the present invention, transfer protection circuitry can be provided to protect each radio section from excess transfer of electric power, including transient currents and voltages, supplied from other radio sections. For example, such transfer protection circuitry in each of M signal lines 232 can include overvoltage protection in the form of resistor R2 and zener diodes D3, D4. Two zener diodes are provided for purposes of redundancy. Each of the M signal lines 232 can also have over-current protection provided by a resistor R3 in series with each control line 232. Similarly, such transfer protection circuitry in each of N signal lines 234 can include overvoltage protection in the form of resistor R4 and zener diodes D5, D6. Each of the N signal lines 234 can also have over-current protection provided by a resistor R5 in series with each control line 234. The transfer protection circuitry provided for control lines 232, 234 limits the power and transients that can be communicated to radio section 201 from radio sections 202, 203. Capacitors C1, C2, and C3 ensure that DC voltages from RF power amplifiers in third radio section 203 cannot be communicated back to radio section 201. Three such capacitors are provided in this example for redundancy; however these could be any plurality of capacitors that meet the requirements of a particular part of an IS standard.

Applicants present certain theoretical aspects above that are believed to be accurate and that appear to explain observations made regarding embodiments of the invention. However, embodiments of the invention may be practiced without the theoretical aspects presented. Moreover, the theoretical aspects are presented with the understanding that Applicants do not seek to be bound by the theory presented.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. A portable radio device comprising:
a portable radio device housing;
a first intrinsically safe circuit (ISC) disposed within said housing and arranged to perform at least one function to facilitate operation of said portable radio device;
at least a second ISC disposed within said housing and arranged to perform at least a second function to facilitate operation of said portable radio device; and
a power distribution circuit disposed within said portable radio device housing and arranged to couple power from a power source to each of said first ISC and said second ISC;
wherein said first ISC includes a first power limiting circuitry interposed between said power distribution circuit and a first functional circuitry for performing said first functions, and at least said second ISC includes a second power limiting circuitry interposed between said power distribution circuit and second functional circuitry for performing said second function; and
wherein said first and second ISC each independently satisfy a defined standard for intrinsic safety selected from the group consisting of FM3610, IEC 60079-11 or ANSI/ISA 60079-11.

2. The portable radio device according to claim 1, wherein said first and second power limiting circuitry are arranged to limit a first total power to said first functional circuitry which is different from a second total power to said second functional circuitry.

3. The portable radio device according to claim 1, wherein said first and second power limiting circuitry respectively comprise a first and second current limiting device.

4. The portable radio device according to claim 3, wherein each of said first and second current limiting devices respectively comprise an exclusive path through which electric power can be communicated to said first and second functional circuitry.

5. The portable radio device according to claim 3, wherein said first power limiting circuitry is further configured to limit a total instantaneous or continuous power which can be communicated to said first functional circuitry.

6. The portable radio device according to claim 5, wherein an instantaneous or continuous power which can be communicated to said first ISC is limited by a first current limiting resistor in series with said first current limiting device.

7. The portable radio device according to claim 6, wherein said first power limiting circuitry further comprises a voltage limiting device for limiting a maximum voltage applied to said first functional circuitry.

8. The portable radio device according to claim 7, wherein said voltage limiting device comprises a plurality of zener diodes.

9. The portable radio device according to claim 1, further comprising a plurality of signal lines for communicating information between said first ISC and at least said second ISC, wherein a total power communicated from said second ISC to said first ISC is limited by a voltage limiting device, and a second current limiting device.

10. The portable radio device according to claim 1, wherein said first functional circuitry comprises at least a microprocessor and a data storage device.

11. The portable radio device according to claim 10, wherein said microprocessor and said data storage device comprise a digital processing section, and said first functional circuitry further comprises circuitry selected from the group consisting of radio frequency (RF) receiver circuitry, RF transmitter circuitry, frequency synthesizer circuitry, and radio backlight circuitry.

12. The portable radio device according to claim 11, wherein said second functional circuitry further comprises audio circuitry for producing received audio signals.

13. The portable radio device according to claim 11, wherein said second functional circuitry further comprises transmitter RF power amplifier circuitry.

14. The portable radio device according to claim 1, further comprising third ISC disposed within said housing and arranged to perform at least a third function to facilitate operation of said portable radio device.

15. The portable radio device according to claim 1, wherein said first ISC and at least said second ISC are physically isolated.

16. A portable radio device comprising:
a portable radio device housing;
a first intrinsically safe circuit (ISC) disposed within said housing and arranged to perform at least one function to facilitate operation of said portable radio device;
a second ISC disposed within said housing and arranged to perform at least a second function to facilitate operation of said portable radio device;
a third ISC disposed within said housing and arranged to perform at least a third function to facilitate operation of said portable radio device;
a power distribution circuit disposed within said housing and arranged to couple power from at least one power source to each of said first, second and third ISC;
wherein said first, second and third ISC respectively include a first, second and third power limiting circuitry respectively interposed between said power distribution circuit and a first, second and third functional circuitry for performing said first, second and third functions, said first, second and third power limiting circuitry are each arranged to limit a total power which can be communicated to said first, second and third functional circuitry, respectively; and
wherein said first, second and third ISC each independently satisfy a defined standard for intrinsically safe devices selected from the group consisting of FM3610, IEC 60079-11 or ANSI/ISA 60079-11.

17. The portable radio device according to claim 16, wherein said first functional circuitry comprises a digital processing section of said radio, said second functional circuitry comprises an audio section of said radio, and said third functional circuitry comprises an RF power amplifier section of said radio.

18. The portable radio device according to claim 17, wherein said first power limiting circuitry is further configured to limit a total instantaneous or continuous power which can be communicated to said first functional circuitry.

19. The portable radio device according to claim 18, wherein said first power limiting circuitry includes a first current limiting device, and a second current limiting device, which are connected in series along an exclusive path through which electric power is communicated to said first functional circuitry.

20. The portable radio device according to claim 19, wherein said first power limiting circuitry further comprises a voltage limiting device for limiting a maximum voltage applied to said first functional circuitry.

21. The portable radio device according to claim 16, wherein said first ISC and at least said second ISC are physically isolated.

22. A portable radio device comprising:
a portable radio device housing;
a first intrinsically safe circuit (ISC) disposed within said housing and arranged to perform at least one function to facilitate operation of said portable radio device;
at least a second ISC disposed within said housing and arranged to perform at least a second function to facilitate operation of said portable radio device;
a power distribution circuit disposed within said housing and arranged to couple power from a power source to each of said first ISC and at least said second ISC;
wherein said first ISC includes a first power limiting circuitry interposed between said power distribution circuit and a first functional circuitry for performing said first functions, and at least said second ISC includes a second power limiting circuitry interposed between said power distribution circuit and second functional circuitry for performing said second function;
wherein said first and second ISC each independently satisfy a defined standard for intrinsically safe devices; and
wherein said first power limiting circuitry limits measured matched power of said first ISC to a value which is less than a predetermined value defined by a standard selected from the group consisting of FM3610, IEC 60079-11 or ANSI/ISA 60079-11.

23. The portable radio device according to claim 22, wherein said first functional circuitry comprises a digital processing section of said portable radio device.

24. The portable radio device according to claim 22, wherein said first ISC and at least said second ISC are physically isolated.

* * * * *